US011277369B1

(12) United States Patent
Motamedi et al.

(10) Patent No.: US 11,277,369 B1
(45) Date of Patent: Mar. 15, 2022

(54) MESSAGE QUEUE ARCHITECTURE AND INTERFACE FOR A MULTI-APPLICATION PLATFORM

(71) Applicant: ServiceNow, Inc., Santa Clara, CA (US)

(72) Inventors: Khosrow Jian Motamedi, San Diego, CA (US); Nikhil Prashant Bendre, San Diego, CA (US); Harry Thomas Nelson, San Diego, CA (US); Sunil Kumar, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 17/189,782

(22) Filed: Mar. 2, 2021

(51) Int. Cl.
| | | |
|---|---|---|
| *G06F 15/16* | (2006.01) |
| *H04L 51/226* | (2022.01) |
| *H04L 67/55* | (2022.01) |
| *H04L 51/00* | (2022.01) |
| *H04L 41/5022* | (2022.01) |
| *H04L 47/50* | (2022.01) |

(52) U.S. Cl.
CPC .......... *H04L 51/26* (2013.01); *H04L 41/5022* (2013.01); *H04L 51/14* (2013.01); *H04L 67/26* (2013.01); *H04L 47/50* (2013.01)

(58) Field of Classification Search
CPC ..... H04L 51/26; H04L 51/14; H04L 41/5022; H04L 67/26
USPC .................................................. 709/217, 238
See application file for complete search history.

(56) References Cited

U.S. PATENT DOCUMENTS

| | | |
|---|---|---|
| 4,941,084 A | 7/1990 | Terada et al. |
| 5,185,860 A | 2/1993 | Wu |
| | (Continued) | |

FOREIGN PATENT DOCUMENTS

| | | |
|---|---|---|
| EP | 0433979 | 6/1991 |
| EP | 1607824 | 12/2005 |
| | (Continued) | |

OTHER PUBLICATIONS

"Message queue—Wikipedia," https://en.wikipedia.org/wiki/Message_queue, printed Jan. 26, 2021.

*Primary Examiner* — Karen C Tang
(74) *Attorney, Agent, or Firm* — McDonnell Boehnen Hulbert & Berghoff LLP

(57) ABSTRACT

Non-volatile memory may contain definitions of: (i) a plurality of message queue implementations respectively associated with different queue behaviors, the different queue behaviors specified by corresponding sets of modes, and (ii) an application programming interface (API) through which applications can access one or more message queues. One or more processors may be configured to: create a message queue of a particular message queue type, supported by a corresponding message queue implementation, by specifying a set of modes corresponding to a queue behavior; receive, from a producing application and by way of the API, one or more messages for the message queue; store the one or more messages in a data structure associated with the message queue; receive, from a consuming application and by way of the API, a request to read from the message queue; and provide a message from the message queue to the consuming application.

20 Claims, 14 Drawing Sheets

(56) References Cited

U.S. PATENT DOCUMENTS

| | | |
|---|---|---|
| 5,237,518 A | 8/1993 | Sztipanovits et al. |
| 5,261,097 A | 11/1993 | Saxon |
| 5,265,252 A | 11/1993 | Rawson, III et al. |
| 5,367,685 A | 11/1994 | Gosling |
| 5,390,297 A | 2/1995 | Barber et al. |
| 5,442,791 A | 8/1995 | Wrabetz et al. |
| 5,452,415 A | 9/1995 | Hotka |
| 5,522,042 A | 5/1996 | Fee et al. |
| 5,533,116 A | 7/1996 | Vesterinen |
| 5,655,081 A | 8/1997 | Bonnell et al. |
| 5,659,736 A | 8/1997 | Hasegawa et al. |
| 5,671,412 A | 9/1997 | Christiano |
| 5,696,701 A | 12/1997 | Burgess et al. |
| 5,715,463 A | 2/1998 | Merkin |
| 5,745,879 A | 4/1998 | Wyman |
| 5,761,502 A | 6/1998 | Jacobs |
| 5,764,913 A | 6/1998 | Jancke et al. |
| 5,887,139 A | 3/1999 | Madison, Jr. et al. |
| 5,909,217 A | 6/1999 | Bereiter |
| 5,937,165 A | 8/1999 | Schwaller et al. |
| 5,949,976 A | 9/1999 | Chappelle |
| 5,978,594 A | 11/1999 | Bonnell et al. |
| 6,021,437 A | 2/2000 | Chen et al. |
| 6,041,347 A | 3/2000 | Harsham et al. |
| 6,088,717 A | 7/2000 | Reed et al. |
| 6,101,500 A | 8/2000 | Lau |
| 6,128,016 A | 10/2000 | Coelho et al. |
| 6,131,118 A | 10/2000 | Stupek, Jr. et al. |
| 6,134,581 A | 10/2000 | Ismael et al. |
| 6,138,122 A | 10/2000 | Smith et al. |
| 6,148,335 A | 11/2000 | Haggard et al. |
| 6,166,732 A | 12/2000 | Mitchell et al. |
| 6,167,448 A | 12/2000 | Hemphill et al. |
| 6,175,866 B1 | 1/2001 | Holloway et al. |
| 6,175,878 B1 | 1/2001 | Seaman et al. |
| 6,260,050 B1 | 7/2001 | Yost et al. |
| 6,263,457 B1 | 7/2001 | Anderson et al. |
| 6,272,150 B1 | 8/2001 | Hrastar et al. |
| 6,336,138 B1 | 1/2002 | Caswell et al. |
| 6,363,421 B2 | 3/2002 | Barker et al. |
| 6,393,386 B1 | 5/2002 | Zager et al. |
| 6,397,245 B1 | 5/2002 | Johnson, II et al. |
| 6,434,626 B1 | 8/2002 | Prakash et al. |
| 6,438,592 B1 | 8/2002 | Killian |
| 6,456,306 B1 | 9/2002 | Chin et al. |
| 6,466,932 B1 | 10/2002 | Dennis et al. |
| 6,487,590 B1 | 11/2002 | Foley et al. |
| 6,505,248 B1 | 1/2003 | Casper et al. |
| 6,526,442 B1 | 2/2003 | Stupek, Jr. et al. |
| 6,621,823 B1 | 9/2003 | Mellquist et al. |
| 6,707,795 B1 | 3/2004 | Noorhosseini et al. |
| 6,742,015 B1 | 5/2004 | Bowman-Amuah |
| 6,763,380 B1 | 7/2004 | Mayton et al. |
| 6,816,898 B1 | 11/2004 | Scarpelli et al. |
| 6,895,586 B1 | 5/2005 | Brasher et al. |
| 6,948,175 B1 | 9/2005 | Fong et al. |
| 6,985,901 B1 | 1/2006 | Sachse et al. |
| 7,003,564 B2 | 2/2006 | Greuel et al. |
| 7,028,228 B1 | 4/2006 | Lovy et al. |
| 7,043,537 B1 | 5/2006 | Pratt |
| 7,043,661 B2 | 5/2006 | Valadarsky et al. |
| 7,062,683 B2 | 6/2006 | Warpenburg et al. |
| 7,096,459 B2 | 8/2006 | Keller et al. |
| 7,146,574 B2 | 12/2006 | Goldthwaite et al. |
| 7,197,466 B1 | 3/2007 | Peterson et al. |
| 7,215,360 B2 | 5/2007 | Gupta |
| 7,216,304 B1 | 5/2007 | Gourdol et al. |
| 7,222,147 B1 | 5/2007 | Black et al. |
| 7,281,170 B2 | 10/2007 | Taylor et al. |
| 7,299,277 B1 * | 11/2007 | Moran ............... H04L 41/5022 370/230 |
| 7,412,502 B2 | 8/2008 | Fearn et al. |
| 7,505,872 B2 | 3/2009 | Keller et al. |
| 7,593,013 B2 | 9/2009 | Agutter et al. |
| 7,596,716 B2 | 9/2009 | Frost et al. |
| 7,617,073 B2 | 11/2009 | Trinon et al. |
| 7,660,731 B2 | 2/2010 | Chaddha et al. |
| 7,676,294 B2 | 3/2010 | Baier et al. |
| 7,676,437 B2 | 3/2010 | Satkunanathan et al. |
| 7,840,490 B1 | 11/2010 | Sellers et al. |
| 7,877,783 B1 | 1/2011 | Cline et al. |
| 7,890,869 B1 | 2/2011 | Mayer et al. |
| 7,966,398 B2 | 6/2011 | Wiles, Jr. |
| 8,060,396 B1 | 11/2011 | Bessler et al. |
| 8,196,210 B2 | 6/2012 | Sterin |
| 8,321,948 B2 | 11/2012 | Robinson et al. |
| 8,407,669 B2 | 3/2013 | Yee et al. |
| 8,554,750 B2 | 10/2013 | Rangarajan et al. |
| 8,595,647 B2 | 11/2013 | Sabin et al. |
| 8,620,818 B2 | 12/2013 | Hughes et al. |
| 8,646,093 B2 | 2/2014 | Myers et al. |
| 8,674,992 B2 | 3/2014 | Poston et al. |
| 8,725,647 B2 | 5/2014 | Disciascio et al. |
| 9,053,460 B2 | 6/2015 | Gilbert et al. |
| 9,098,555 B2 | 8/2015 | Bjork et al. |
| 10,079,730 B2 | 9/2018 | Subramanian et al. |
| 10,812,608 B1 * | 10/2020 | Thummala Abbigari ................... H04L 51/14 |
| 2002/0116340 A1 | 8/2002 | Hellberg et al. |
| 2002/0133584 A1 | 9/2002 | Greuel et al. |
| 2002/0158969 A1 | 10/2002 | Gupta |
| 2003/0014551 A1 * | 1/2003 | Ishibashi ................ H04L 51/18 719/310 |
| 2003/0118087 A1 | 6/2003 | Goldthwaite et al. |
| 2003/0200293 A1 | 10/2003 | Fearn et al. |
| 2005/0015217 A1 | 1/2005 | Weidl et al. |
| 2005/0091356 A1 | 4/2005 | Izzo |
| 2006/0026453 A1 | 2/2006 | Frost et al. |
| 2006/0028982 A1 * | 2/2006 | Wright ................ H04L 12/2859 370/230 |
| 2006/0095461 A1 | 5/2006 | Raymond |
| 2006/0120282 A1 * | 6/2006 | Carlson ................ H04L 47/805 370/229 |
| 2006/0179058 A1 | 8/2006 | Bram et al. |
| 2006/0248145 A1 * | 11/2006 | Karmakar ............... H04L 69/16 709/206 |
| 2006/0293942 A1 | 12/2006 | Chaddha et al. |
| 2007/0033279 A1 | 2/2007 | Battat et al. |
| 2007/0073821 A1 * | 3/2007 | Brail ...................... H04L 67/26 709/206 |
| 2007/0188494 A1 | 8/2007 | Agutter et al. |
| 2007/0288389 A1 | 12/2007 | Vaughan et al. |
| 2008/0133289 A1 | 6/2008 | Armour et al. |
| 2008/0148253 A1 | 6/2008 | Badwe et al. |
| 2008/0310439 A1 * | 12/2008 | Gale .................... H04L 47/245 370/412 |
| 2008/0319779 A1 | 12/2008 | Hughes et al. |
| 2009/0088875 A1 | 4/2009 | Baier et al. |
| 2009/0228984 A1 | 9/2009 | Sterin |
| 2010/0110932 A1 | 5/2010 | Doran et al. |
| 2011/0261688 A1 * | 10/2011 | Sharma ............... H04L 41/5022 370/230 |
| 2012/0016706 A1 | 1/2012 | Pargaonkar et al. |
| 2015/0281126 A1 * | 10/2015 | Regula .................... H04L 67/26 709/212 |
| 2016/0359666 A1 * | 12/2016 | Ledwith .................. H04L 67/06 |
| 2017/0063946 A1 * | 3/2017 | Quan ...................... H04L 67/20 |
| 2017/0214762 A1 * | 7/2017 | Swain ..................... H04L 51/26 |
| 2019/0056978 A1 * | 2/2019 | Ruiz-Meraz ............ H04L 51/24 |
| 2020/0220926 A1 * | 7/2020 | Herbert ..................... G06F 8/65 |

FOREIGN PATENT DOCUMENTS

| | | |
|---|---|---|
| WO | 99/34285 | 7/1999 |
| WO | WO 00/52559 | 9/2000 |
| WO | WO 01/79970 | 10/2001 |

* cited by examiner

| | |
|---|---|
| QUEUE IMPLEMENTATION 606A | MESSAGING MODE: POINT-TO-POINT<br>ORDERING MODE: PRIORITY<br>DELIVERY MODE: PERSISTENT<br>CONNECTION MODE: UNIDIRECTIONAL |
| QUEUE IMPLEMENTATION 606B | MESSAGING MODE: PUBLISH/SUBSCRIBE<br>ORDERING MODE: CHRONOLOGICAL<br>DELIVERY MODE: PERSISTENT<br>CONNECTION MODE: UNIDIRECTIONAL |
| QUEUE IMPLEMENTATION 606C | MESSAGING MODE: POINT-TO-POINT<br>ORDERING MODE: CHRONOLOGICAL<br>DELIVERY MODE: PERSISTENT CACHED<br>CONNECTION MODE: BIDIRECTIONAL |
| QUEUE IMPLEMENTATION 606D | MESSAGING MODE: POINT-TO-POINT<br>ORDERING MODE: CHRONOLOGICAL<br>DELIVERY MODE: IN-MEMORY<br>CONNECTION MODE: UNIDIRECTIONAL |
| QUEUE IMPLEMENTATION 606E | MESSAGING MODE: POINT-TO-POINT<br>ORDERING MODE: PRIORITY<br>DELIVERY MODE: IN-MEMORY<br>CONNECTION MODE: UNIDIRECTIONAL |

API 900

902 → `public class MQ extends java.lang.object`

904 → `public static void send (IMessage message)`

Places message into a message queue. The message queue is determined based on the properties specified in message as well as those set in the context associated with message.

906 → `public static void send (string destinationName, string messageBody)`

Constructs an instance of IMessage with messageBody as its body, and places the message in the message queue identified by the name destinationName.

908 → `public static void send (string destinationName, string messageBody, map<string,string> mqProperties)`

Constructs an instance of IMessage with messageBody as its body and desired queueing treatment defined by mqProperties, and places the message in the message queue identified by the name destinationName.

910 → `public static void send (string destinationName, string messageBody, map<string,string> mqProperties, map<string,string> clientParameters)`

Constructs an instance of IMessage with messageBody as its body, client header defined by clientParameters and desired queueing treatment defined by mqProperties, and places the message in the message queue identified by the name destinationName.

912 → `public static IMessage poll (string destinationName)`

Returns the next message on the message queue identified by destinationName.

FIG. 9

MESSAGE QUEUE ARCHITECTURE AND INTERFACE FOR A MULTI-APPLICATION PLATFORM

BACKGROUND

Multi-application platforms, such as remote network management platforms, may support the development, configuration, and/or execution of numerous standardized or custom applications. These applications may have the need to, or benefit from the ability to, communicate either internally or with other applications. One possible mechanism for carrying out this communication is through use of message queues.

In general, message queues temporarily store messages that are to be delivered from a producing application to a consuming application. Depending on the implementation, execution state, and/or workload of the consuming application, a message may be stored in a queue for some period of time before it is read by the consuming application. Message queues may support ordered delivery, in the sense that they deliver messages in a first-in-first-out (FIFO) fashion, or they may support some form of non-FIFO order.

Regardless, different applications may be designed to use different implementations of message queues and the various queue types supported by these implementations. This can lead to disparate queueing solutions either being implemented as part of the platform or incorporated into these applications.

SUMMARY

In order to improve the efficiency, extensibility, and consistency of a multi-application platform, a common message queue architecture and application programming interface for using this architecture are provided. Advantageously, applications and application developers do not need to have specialized knowledge of, or explicitly specify, a particular underlying message queue implementation to use. Instead, developers and/or their applications may specify the queue behavior they desire, and the platform selects a message queue implementation from a set of available implementations. Example behaviors include messaging mode (e.g., point-to-point or publish/subscribe), ordering mode (e.g., priority or chronological), delivery mode (e.g., persistent, persistent cached, or in-memory), and/or connection mode (unidirectional or bidirectional).

A large number of message queue implementations may be supported, and the platform may expand supported implementations from time to time. Once requested by an application, a message queue supported by an appropriate implementation is provided by the platform for use by the application. This message queue may already be in existence, may be configured statically in a database, or may be created dynamically in response to the request. Internal to the platform, all message queue implementations may utilize a common message structure encompassing a service header for use by the message queue framework, a client header determined by the producing application, and a message body determined by the producing application.

Some embodiments may support a priority ordering mode with multiple levels of priority and a yield capability specified per level. The yield capability prevents service of higher-priority messages from starving service of lower-priority messages. In particular, each level of priority may be configured to, per n messages transmitted of that level, let m messages of a lower-priority level be delivered.

Further, this architecture allows for previously-existing and/or legacy queue implementations that were developed independently and without adherence to a unified architecture and application programming interface to be integrated with this architecture and made available to applications through the common application programming interface. Advantageously, the combination of message queue features herein result in an infrastructure that is flexible, extensible, and intuitive.

Accordingly, a first example embodiment may involve non-volatile memory containing definitions of: (i) a plurality of message queue implementations respectively associated with different queue behaviors, wherein the different queue behaviors are specified by corresponding sets of modes, and (ii) an application programming interface (API) through which applications executing on the system can access one or more message queues of the message queue implementations. The first example embodiment may further involve one or more processors configured to: create a message queue of a particular message queue type, supported by a corresponding message queue implementation, by specifying a set of modes corresponding to a queue behavior of the particular message queue type; receive, from a producing application and by way of the API, one or more messages for the message queue; in response to receiving the one or more messages, store the one or more messages in a data structure associated with the message queue and in accordance with the set of modes; receive, from a consuming application and by way of the API, a request to read from the message queue; and in response to receiving the request, provide a message from the message queue to the consuming application in accordance with the set of modes.

A second example embodiment may involve creating a message queue of a particular message queue type by specifying a set of modes corresponding to a queue behavior of the particular message queue type, wherein non-volatile memory contains definitions of: (i) a plurality of message queue types respectively associated with different queue behaviors, wherein the different queue behaviors are specified by corresponding sets of modes, and (ii) an API through which applications can access one or more message queues of the message queue types. The second example embodiment may further involve receiving, from a producing application and by way of the API, one or more messages for the message queue. The second example embodiment may further involve, possibly in response to receiving the one or more messages, storing the one or more messages in a data structure associated with the message queue and in accordance with the set of modes. The second example embodiment may further involve receiving, from a consuming application and by way of the API, a request to read from the message queue. The second example embodiment may further involve, possibly in response to receiving the request, providing a message from the message queue to the consuming application in accordance with the set of modes.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 7 depicts message queue behaviors mapped to message queue implementations, in accordance with example embodiments.

FIG. 9 depicts a message queue API, in accordance with example embodiments.

DETAILED DESCRIPTION

Figure 1:
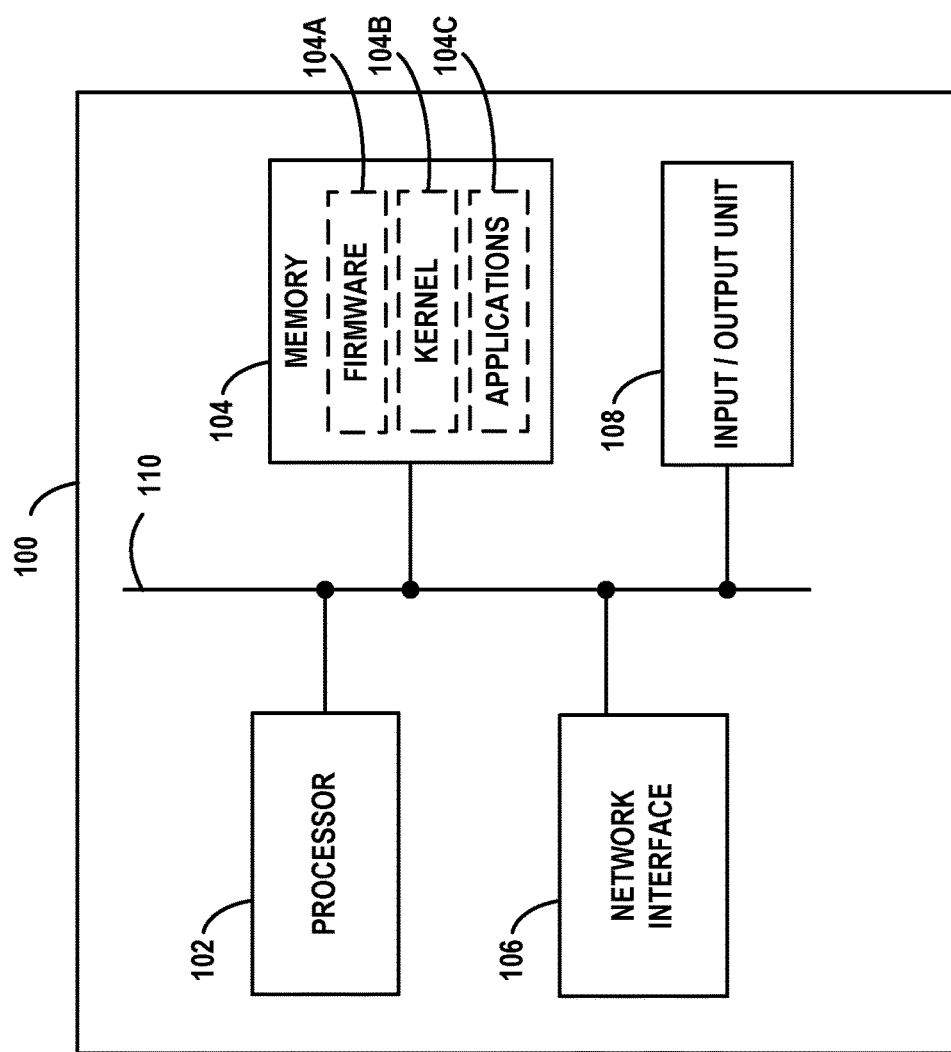
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, and delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more userspace software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
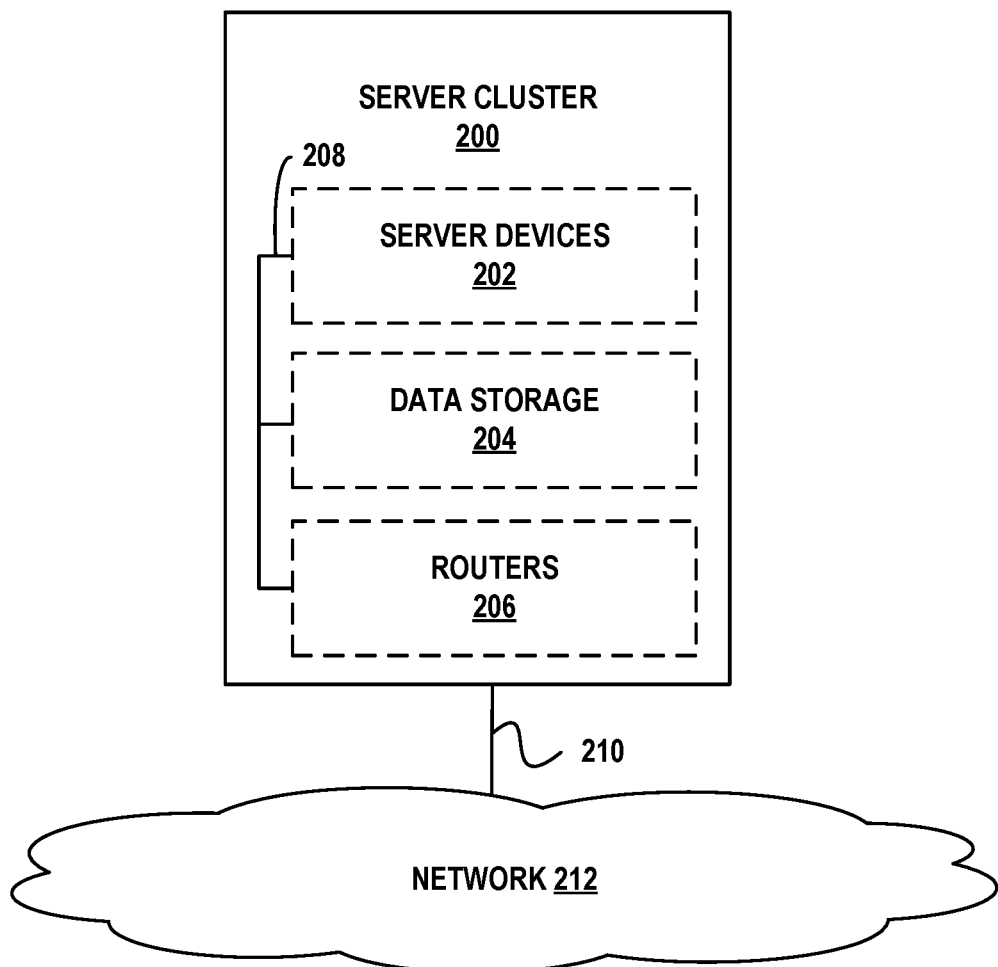
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. Example Remote Network Management Architecture

Figure 3:
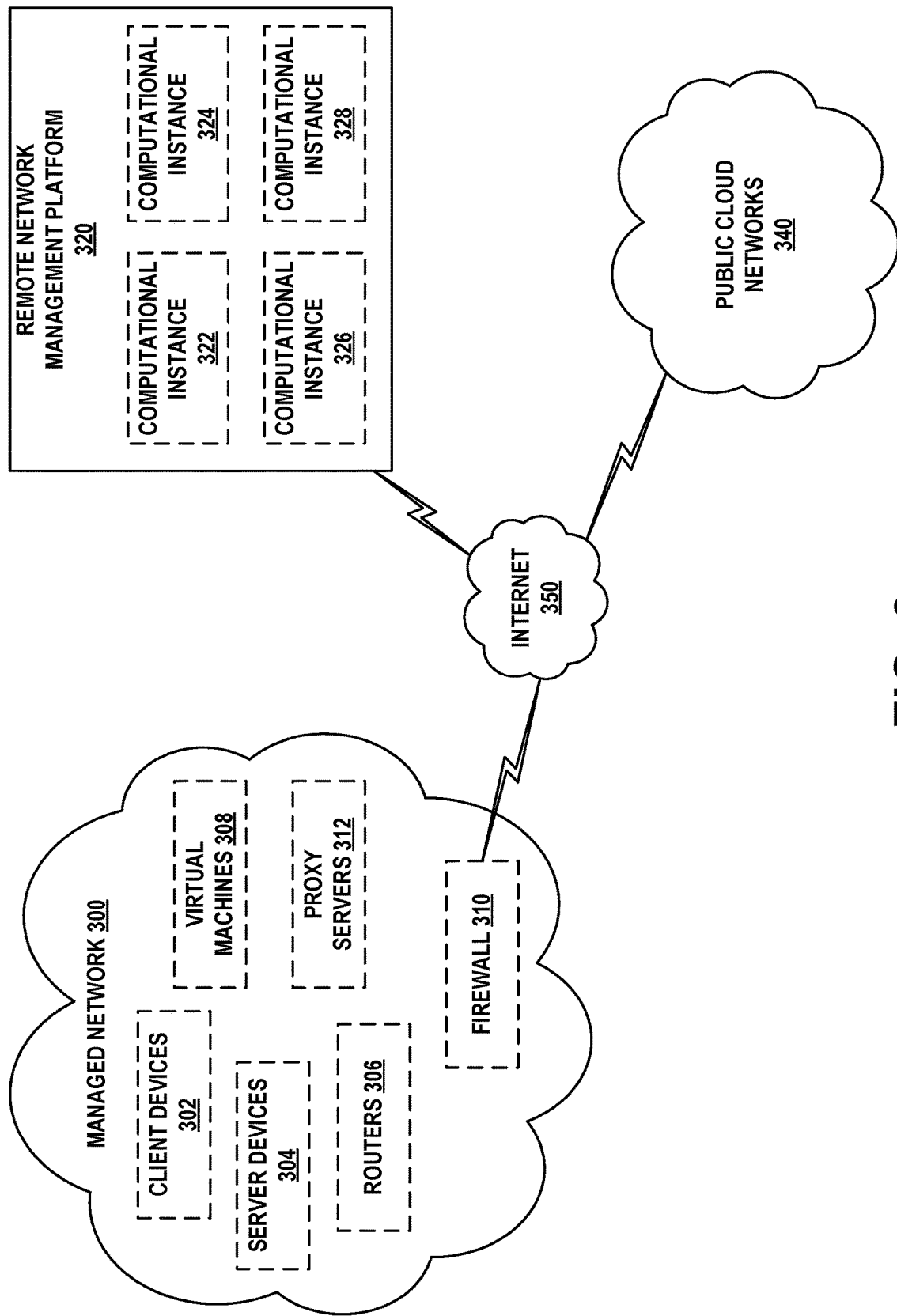
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
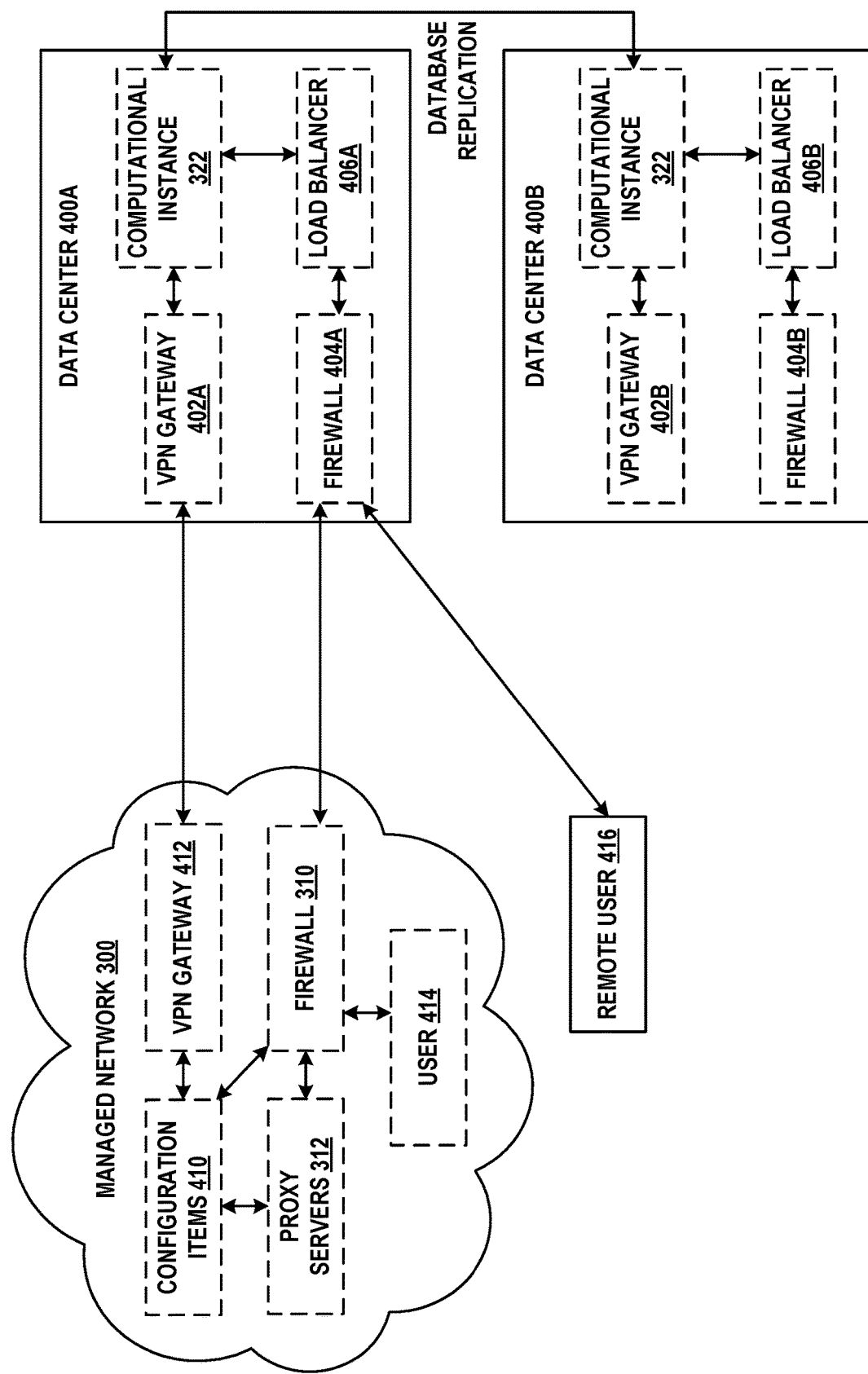
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated, in whole or in part, across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
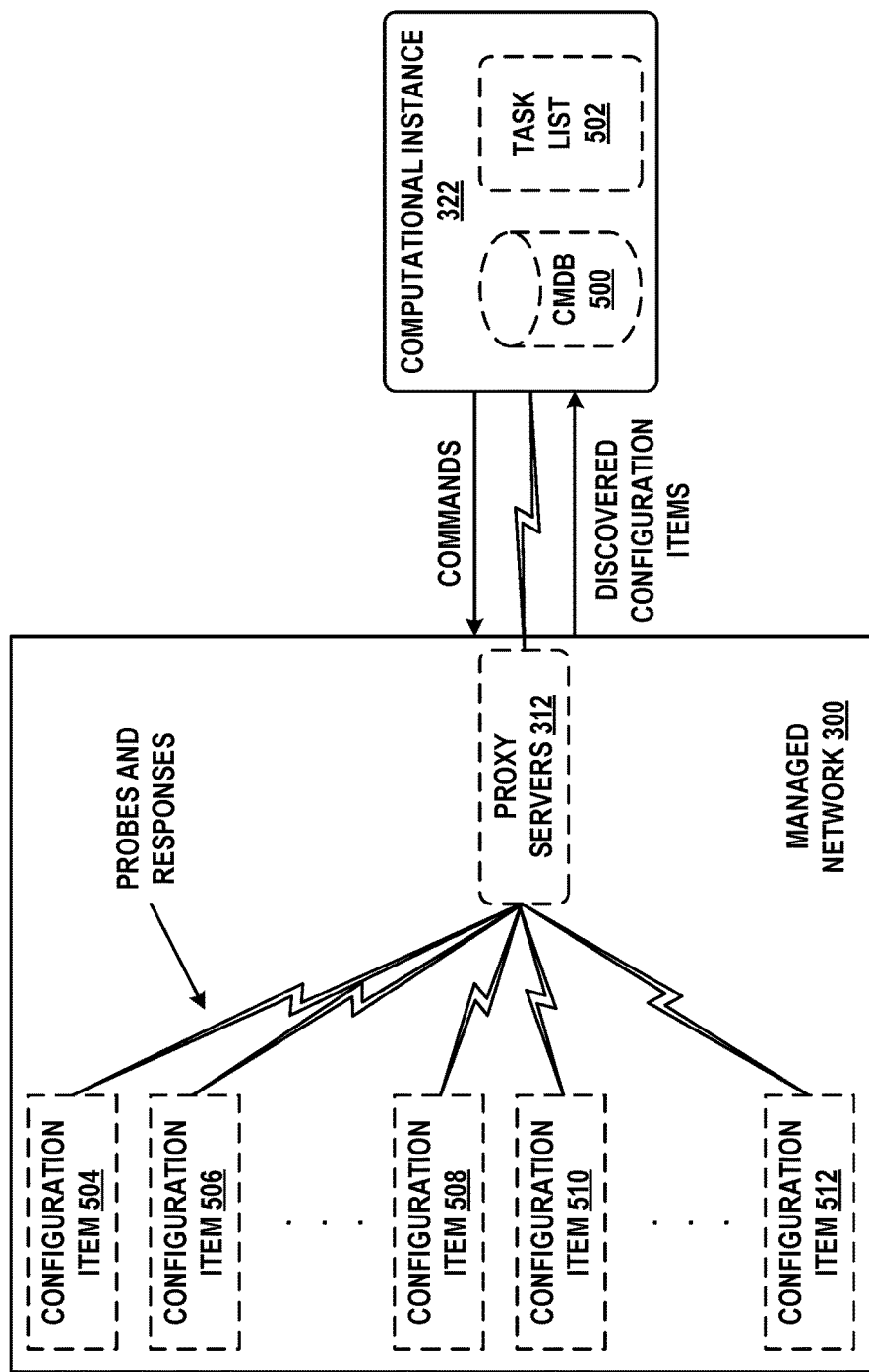
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined.

As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
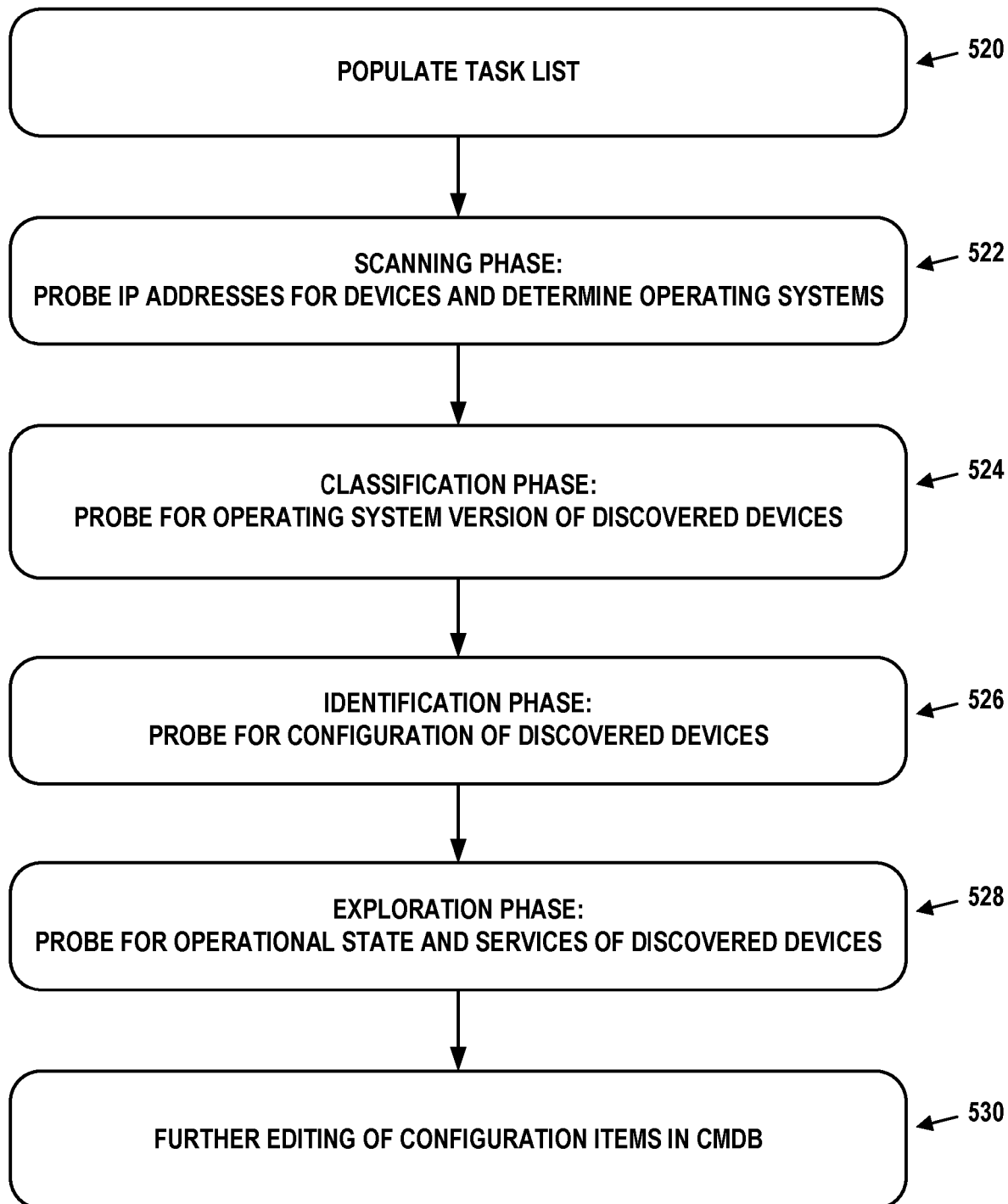
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. Message Queue Support

The embodiments herein provide a flexible message queue architecture for a multi-application platform, such as a remote network management platform. With this architecture, applications can communicate with themselves or other applications by way of one or more message queues with various behaviors.

A message queue is a data structure that can hold an ordered sequence of zero or more messages. Message queues facilitate asynchronous communication between applications, processes, and/or threads. Thus, when an application consists of two or more processes or threads, message queues can be used for intra-application communication. Message queues can also be used for inter-application communication (e.g., between a process or thread of one application and a process or thread of another application).

For sake of simplicity, the description herein will refer to a "producing application" as any process or thread of an application that places messages in a message queue (known as "enqueueing"). The description will also refer to a "consuming application" as any process or thread of an application that reads messages from a message queue (known as "dequeueing"). Intra-application communication occurs when the producing application and the consuming application are the same application (e.g., processes or threads of the same application). There may be multiple producing applications and multiple consuming applications using a message queue.

Individual messages provide content that is to be transmitted from a producing application to a consuming application. This content may take any form (e.g., text strings, binary data) and may be of various lengths. In some embodiments, each message may have one or more associated headers that provide, to the platform and/or the consuming application, metadata related to the message.

Communication facilitated by message queues is deemed to be asynchronous because a message may be stored in a message queue for some period of time between when the producing application writes the message to the message queue and the consuming application reads the message from the message queue. Thus, message queues may offer varying levels of persistence for the messages temporarily stored therein.

While message queues typically order the messages therein in a first-in-first-out (FIFO) fashion, non-FIFO orderings may be supported. This allows certain messages within a message queue to have priority over others in terms of when they will be read by a consuming application.

Message queue architectures of the past utilized different message queue implementations for each type of message queue. This required that the application developer know the behavior of each implementation and the nuances of the associated application programming interfaces (APIs). As a consequence, applications were more difficult to code and maintain.

In contrast, for the embodiments herein, the producing application can specify the message queue behavior that it desires or requires for one or more messages, and the platform maps this behavior to a message queue implementation and corresponding queue. Once mapped, the platform may facilitate the application's use of an existing message queue of this implementation. Alternatively, the platform may create a new message queue of the implementation, and facilitate the application's use of this new queue.

For example, the selection of a set of modes that define queue behavior will resolve to one or more contexts (provided that the set of modes is supported by an existing implementation). Each context, in turn, has a queue name associated with it. This queue name may be referenced by a producing or consuming application when accessing the message queue.

Regardless, some message queues may be pre-configured, and others may be dynamically created by applications. An application developer could statically configure a message queue by specifying the desired behavioral criteria to be used by an application being developed, or use one that already exists and fits the needs at hand. This message queue would then be referenced by its name via a common message queue API. Alternatively, the application itself can create a queue at runtime by specifying a set of behavioral criteria. This ability is useful in cases where there are various factors at runtime that would conditionally necessitate different queue behaviors.

For purposes of the discussion herein, a message queue implementation includes the implementation of a message producer and consumer pair for the internal interfaces of the messaging framework. Each such implementation will have some set of capabilities and thereby support some subset of all possible messaging modes. Each supported combination of modes then constitutes a queue type (e.g. point-to-point, persistent-cached, priority order, unidirectional) and is associated with a context. Each message queue implementation may support one or more queue types.

All of this is offered to applications by way of the message queue API. Doing so dramatically reduces the burden on applications and application developers, resulting in more usable, extensible, maintainable, and stable software.

In these embodiments, message queue implementations—specifically in the form of message producer and message consumer pairs—support one or more queue types and their corresponding behaviors. These pairs may either be complete and self-contained in their implementation of one or more functional criteria (messaging modes, etc.) or may in turn delegate operation to previously-existing or legacy message queue implementations. In that case, these legacy components are hidden behind the single unified message queue API. Application developers and their applications will then have all the functionality of the legacy systems available to them without the need of specific knowledge about these disparate systems, including their respective APIs.

A. Architecture

Figure 6:
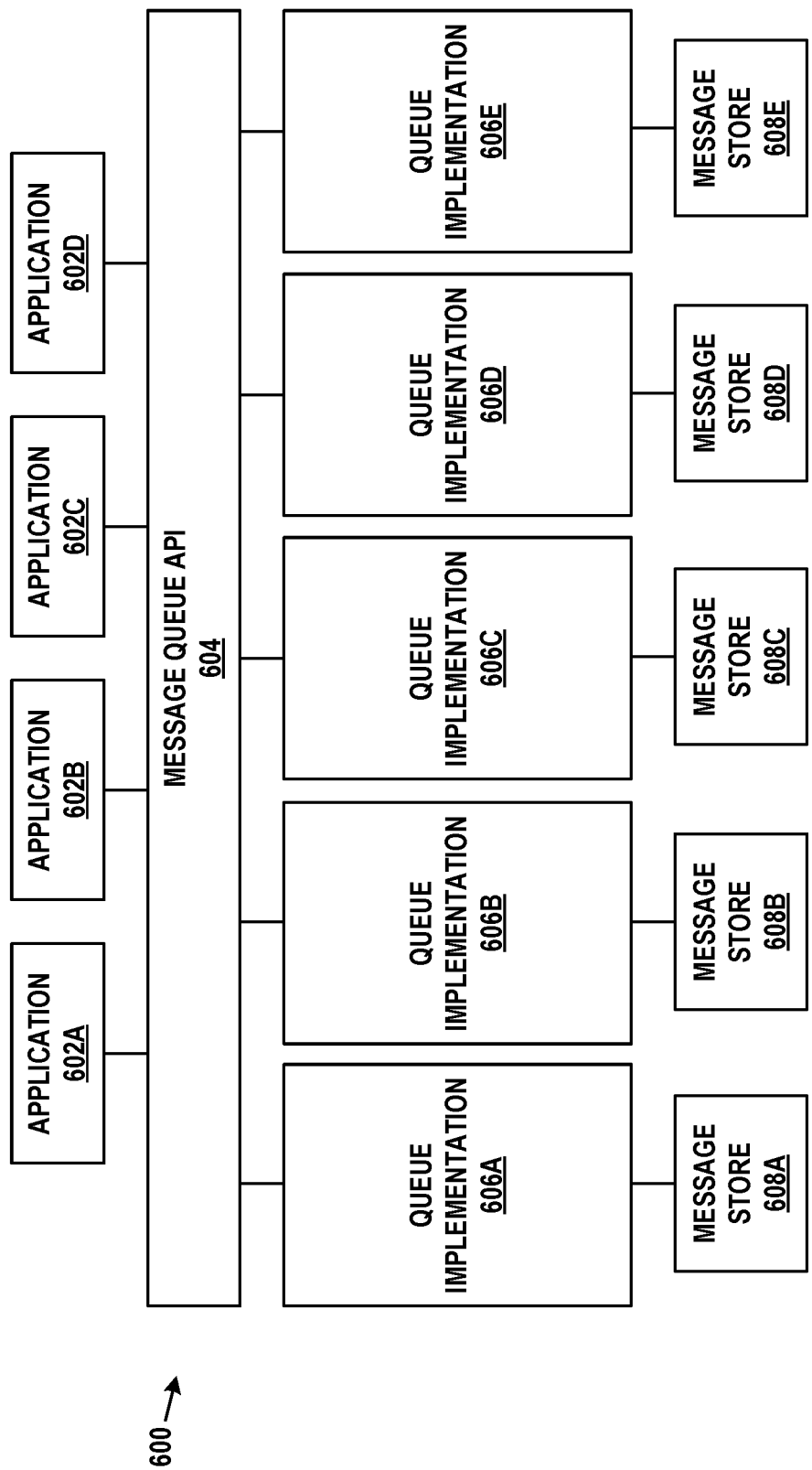
FIG. 6 depicts a message queue architecture, in accordance with example embodiments.

In line with these features, FIG. 6 depicts an example message queue architecture. Notably, architecture 600 includes applications 602A, 602B, 602C, and 602D, message queue API 604, message queue implementations 606A, 606B, 606C, 606D, and 606E, and message stores 608A, 608B, 608C, 608D, and 608E. In various embodiments, more or fewer applications, message queue implementations, and message stores may be present.

Applications 602A, 602B, 602C, and 602D may be any producing or consuming applications configured to execute on a remote network management platform. Thus, for example, these may include the aforementioned HR, supply chain, IT, and finance applications as well as machine-learning applications, performance analysis applications, or various custom applications.

Message queue API 604 may be a library or middleware layer that provides an interface to platform message queue services. API 604 may therefore provide a number of objects, methods, functions, and/or other features to create, delete, configure, write to and/or read from message queues. Notably, each of applications 602A, 602B, 602C, and 602D may make use of API 604 to access message queues of types supported by any of the queue implementations 606A, 606B, 606C, 606D, and 606E.

Message queue implementations 606A, 606B, 606C, 606D, and 606E each support one or more different message queues. Some of the possible behaviors of these queue types are discussed below in the context of FIG. 7. Zero or more queues of each type may be instantiated to operate on the platform, and each instantiated queue may have a unique name. Thus, for example, there may be one queue of a queue type supported by implementation 606A, three queues of a queue type supported by implementation 606B, zero queues of a queue type supported by implementation 606C, two queues of a queue type supported by implementation 606D, and one queue of a queue type supported by implementation 606E.

Message stores 608A, 608B, 608C, 608D, and 608E may respectively correspond to message queue implementations 606A, 606B, 606C, 606D, and 606E. Each message store may refer to one or more types of memory and/or data storage mechanism that is used to store messages for queues of the corresponding queue type. The memory types may include volatile memory (e.g., RAM), non-volatile memory (e.g., one or more files in a file system or entries in a database table), or some combination thereof (e.g., where messages are stored in a database table and also cached in memory).

B. Behavior

Table 700 of FIG. 7 provides example behaviors for queue types supported by message queue implementations 606A, 606B, 606C, 606D, and 606E. These behaviors are specified as combinations of modes. Particularly, the behaviors of message queue implementations 606A, 606B, 606C, 606D, and 606E are each specified as a combination of a messaging mode, an ordering mode, a delivery mode, and a connection mode. But in full generality, more or fewer modes may be configured.

Messaging mode specifies whether the queue type is point-to-point or publish/subscribe. Point-to-point message queues are arranged so that one or more applications add or remove the singular copy of any given message to and from a message queue. Despite its name, point-to-point messaging mode supports multiple producing and consuming applications. But if there are multiple consuming applications, only one will receive each message. In contrast, messages in message queues that support publish/subscribe messaging mode persist so that they each can be read by multiple consuming applications (subscribers). In some cases, these messages persist for a pre-determined amount of time or until they are read by every subscribed message consumer (durable subscribers). In other cases, published messages are delivered only to those subscribers that are present at the time of delivery, and those that are not might never receive those messages (non-durable subscribers). The message queue implementations that support the publish/subscribe mode may ensure that each subscriber will receive each message no more than once. Like point-to-point message queues, there also may be multiple producing applications (publishers) using a publish/subscribe message queue. Message queues in publish/subscribe messaging mode may be referred to as "topics", as in topics of a news feed.

Ordering mode specifies whether messages are delivered chronologically or based on priorities. Chronological delivery means that the message queue operates in a FIFO fashion. Priority delivery means that the message queue operates in a non-FIFO fashion that gives some messages priority over other messages. Example implementations of message priority are described below.

Delivery mode specifies how the messages are stored while they are in a message queue. As noted above, queued messages may be stored in volatile memory, non-volatile memory, or both. These options are presented as in-memory, persistent, and persistent cached modes. In-memory mode specifies that messages are to be stored only in volatile memory (e.g., main memory). Persistent mode specifies that messages are to be stored only in non-volatile memory (e.g., one or more files in a filesystem and/or one or more tables or other locations in a database). Persistent cached mode specifies that messages are to be stored in non-volatile memory, but cached for at least some period of time in volatile memory. The tradeoff between these modes is the latency associated with accessing non-volatile memory versus the relatively limited amount of space in volatile memory. Persistent cached mode facilitates low latencies for the majority of message operations while not allowing in-memory use to expand indefinitely as a queue grows. For example, a queue configured to be in persistent cached mode might only use a configurable portion of volatile memory (e.g., the maximum cache size per queue may be 10 megabytes).

Connection mode specifies whether the queue is unidirectional (from a first application to a second application only) or bidirectional (from a first application to a second application and from the second application to the first application). A bidirectional queue may be implemented as two unidirectional queues, one from a first application to a second application and another from the second application to the first application. For a bidirectional queue, the first application may act as a producing application when it writes to the queue and a consuming application when it reads from the queue. Likewise, the second application may act as a producing application when it writes to the queue and a consuming application when it reads from the queue.

In the example embodiment of FIG. 7, there are two messaging modes, two ordering modes, three delivery modes, and two connection modes. Thus, there are a total of 2×2×3×2=24 possible queue implementations if each of these permutations is supported. A queue of any of these types may be created by specifying the desired behavior as a permutation of modes. An application, a configuration file or a database table may represent such a specification in text, binary, or some other form. This representation may then be read by a message queue implementation or otherwise communicated to API 604 to define a message queue.

But not all permutations need to be supported by the platform. For example, few applications might ever need to use bidirectional, in-memory publish/subscribe message queues with priority ordering. Nonetheless, if a message queue type that is unsupported by the platform is requested, message queue API 604 might respond in various ways. API 604 could return an error to such a request, resulting in no message queue being created. Alternatively, API 604 might include a mapping that indicates a respective supported queue type for each permutation. For example, if a bidirectional, in-memory publish/subscribe message queue with priority ordering is requested, API 604 may instead create a unidirectional, persistent publish/subscribe message queue with priority ordering by effectively ignoring the requested delivery mode and connection mode.

Regardless of implementation, various message queue services can be provided to applications based on the message queue behaviors supported by this architecture. As an example, a real-time messaging service in which some message loss is acceptable can be provided between two or more applications by using a message queue with point-to-point messaging, priority ordering, and in-memory delivery modes. This service will facilitate low latency by providing out-of-order delivery for high-priority messages, and also by keeping the messages stored in volatile memory. Conversely, a bulk service in which all messages must be delivered, but delayed delivery is acceptable, can be supported by a message queue with point-to-point messaging, chronological ordering, and persistent delivery modes. This service will facilitate reliable (e.g., guaranteed) delivery by storing messages in non-volatile memory until they are delivered to the consuming application.

C. Multi-Application Platform Implementation

Figure 8:
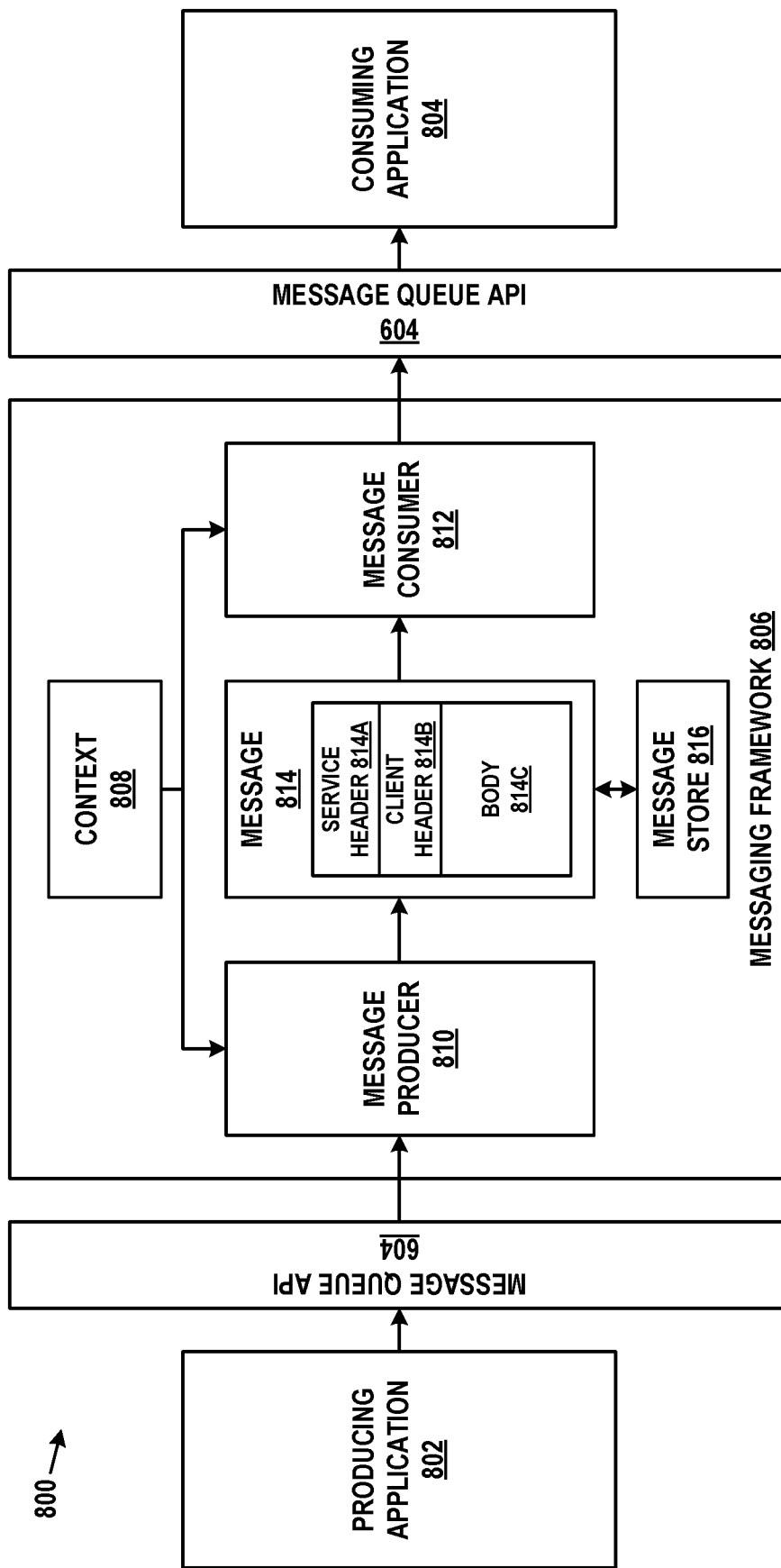
FIG. 8 depicts an architecture for a message queue implementation for a multi-application platform, in accordance with example embodiments.

While the message queues described herein can be implemented in a number of different ways, an example multi-application platform implementation 800 is shown in FIG. 8. Other possibilities exist.

In FIG. 8, producing application 802 communicates messages to consuming application 804 by way of messaging framework 806. Particularly, producing application 802 transmits message content by way of API 604 and consuming application 804 receives message content by way of API 604. While API 604 is shown in two different locations in FIG. 8, this is for purposes of illustration, and API 604 may be embodied by a single library and/or set of interfaces.

Messaging framework 806 includes context 808, message producer 810, message consumer 812, message 814, and message store 816. Context 808, message producer 810, message consumer 812, and message store 816 may implement, serve and/or operate one or more message queue types and their corresponding queues. But these components could instead represent a single queue type and its corresponding queue(s). In some cases, there may be no messages or more than one message in such a message queue. But just one message (message 814) is shown in FIG. 8 for sake of convenience.

Context 808 contains mappings of behaviors (as defined by modes) to queue implementations, as well the names of the queues associated with each queue implementation. For example, context 808 may store specifications of queue implementations as well as references to instantiated message queues. Context 808 may then select an appropriate message producer and message consumer to facilitate a particular set of selected behaviors. Additionally, context 808 may provide some subset of this information to message producer 810 and message consumer 812. In some embodiments, context 808 may be a context factory that generates one or more of the available contexts. Each of these contexts may be associated with one combination of message modes and one specific queue of the particular type.

Message producer 810 is a module that receives message content from producing application 802 by way of API 604. Message producer 810 determines how and where to enqueue this message content based on its metadata and/or on context 808. For example, message producer 810 may determine a message queue name from the message content or metadata and then locate the appropriate message queue. Additionally, the metadata may contain parameters that more finely define the behavior of the particular specified queue for that particular message.

Message consumer 812 is a module that responds to requests from consuming application 804 by way of API 604. These requests may be to read a message (e.g., the next message) from a message queue with a specific name. Message consumer 812 may identify the message queue based on this name, and then read and possibly dequeue an appropriate message from the message queue. The next message may be one that chronologically follows the previous delivered message (in the case of a FIFO message queue), one that has the highest priority of all remaining messages on the queue, or one that logically follows the previous message based on a priority scheme modified by a yield policy.

Message 814 represents a single message in a queue of possibly many such messages. Message 814 is arranged into service header 814A, client header 814B, and body 814C. Service header 814A may contain metadata (e.g., parameters) that is used by messaging framework 806, such as a specification of the priority of message 814 or a timestamp of message 814. Producing application 802 may provide information for service header 814A or this information may be added by message producer 810. Client header 814B may contain metadata (e.g., parameters) that is passed between producing application 802 and consuming application 804, such as an identifier of producing application 802. In some embodiments, messaging framework 806 may ignore the content of client header 814B and pass it transparently to consuming application 804. Body 814C contains the actual raw message. As noted above, this content can be in various forms, such as text, audio, video, binary, etc.

Message store 816 represents the message store used for the message queue of message 814. As such, message store 816 may be volatile memory, non-volatile memory, or some combination thereof. Message store 816 is a logical part of messaging framework 806. It may physically reside outside of messaging framework 806 in various embodiments.

D. API

While message queue APIs can be defined and operated in a number of ways, FIG. 9 provides an example definition of an API for the message queue embodiments herein. Thus, API 900 corresponds to a possible implementation of message queue API 604. In particular API 900 includes a class definition 902 and methods 904, 906, 908, 910, and 912 for this class.

In general, placing a message in a message queue involves naming the queue explicitly. This is done by either setting destination name in an IMessage or—in the case of send( ) methods where the raw message body rather than IMessage is passed—by passing a destinationName argument. Other possibilities exist.

Class definition 902 assumes a JAVA® implementation, but implementation in other programming languages is possible. Further, the arguments to methods 904, 906, 908, 910, and 912 may be simplified for purposes of illustration. Moreover, in some embodiments, more or fewer methods, or different methods, may be possible.

Method 904 can be called by producing application 802. Particularly, producing application 802 provides, to a send( ) function, an instance of an IMessage class or data structure that defines a message. Such an IMessage may specify one or more of a message queue name, a message body, client headers, and message queue properties (e.g., defining a desired queueing treatment). Method 904 then places the message in the appropriate message queue based on the provided message queue name. The message queue properties may instruct message producer 810 and message consumer 812 as to the precise manner of handling (e.g. guaranteed delivery, to be made after the delivery and completion of processing of message x and before delivery of message z).

Method 906 also can be called by producing application 802. Particularly, producing application 802 provides, to a send( ) function, the name of a message queue and a message body. Method 906 constructs an IMessage from these arguments and places the IMessage in the specified message queue.

Method 908 also can be called by producing application 802. Particularly, producing application 802 provides, to a send( ) function, the name of a message queue, a message body, and message queue properties. The message queue properties are specified as a set of key-value pairs. Method 908 constructs an IMessage from these arguments and places the IMessage in the specified message queue.

Method 910 also can be called by producing application 802. Particularly, producing application 802 provides, to a send( ) function, the name of a message queue, a message body, message queue properties, and client parameters. The message queue properties and client parameters are specified as a set of key-value pairs. Method 910 constructs an IMessage from these arguments and places the IMessage in the specified message queue.

Method 912 can be called by consuming application 804. Particularly, consuming application 804 provides, to a poll( ) function, the name of a message queue. Method 912 returns the next message on this message queue in accordance with the message queue's defined behaviors.

Message queue properties control delivery of messages within the larger framework of the implementation associated with the context. Examples of message queue properties could include priority (described below) and/or an optional "deliver-not-before" (also referred to as "process_on") timestamp. The timestamp indicates the earliest time that the message can be delivered to a consuming application. If such a message were otherwise logically the next message to be delivered but appears prior to the "deliver-not-before" time, it will not be delivered until this time has arrived or passed. Once this condition is met, the message becomes the next message to be delivered. This behavior is carried out by message consumer 812. This allows messages to be delivered after a specific time, which can be helpful in the orchestration of applications, in reducing load due to bursts of messages, and/or to remind users of an event closer to the time that the event is scheduled to occur.

E. Flow Diagrams

Figure 10:
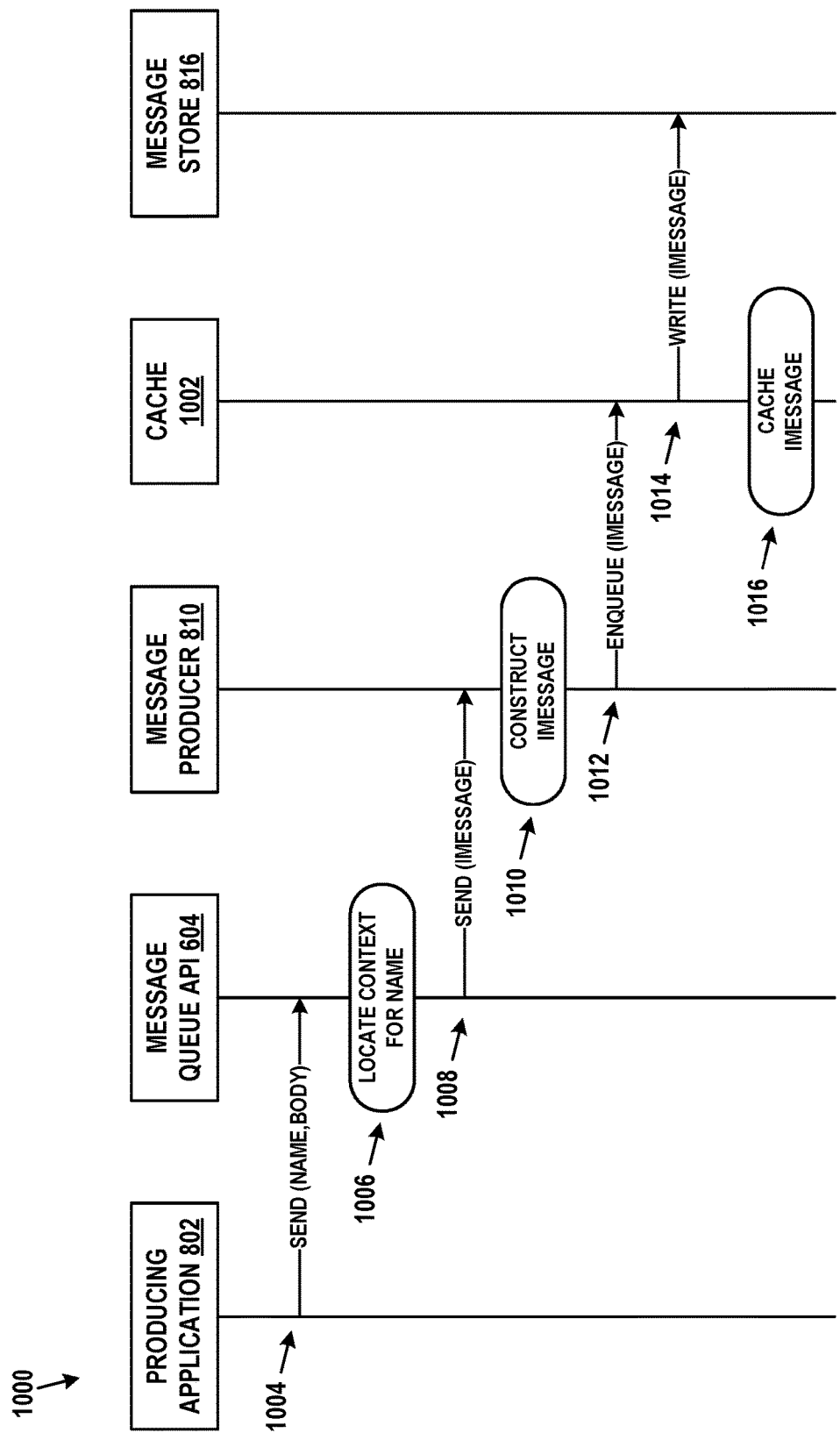
FIG. 10 is a flow diagram for placing a message in a message queue, in accordance with example embodiments.
Figure 11:
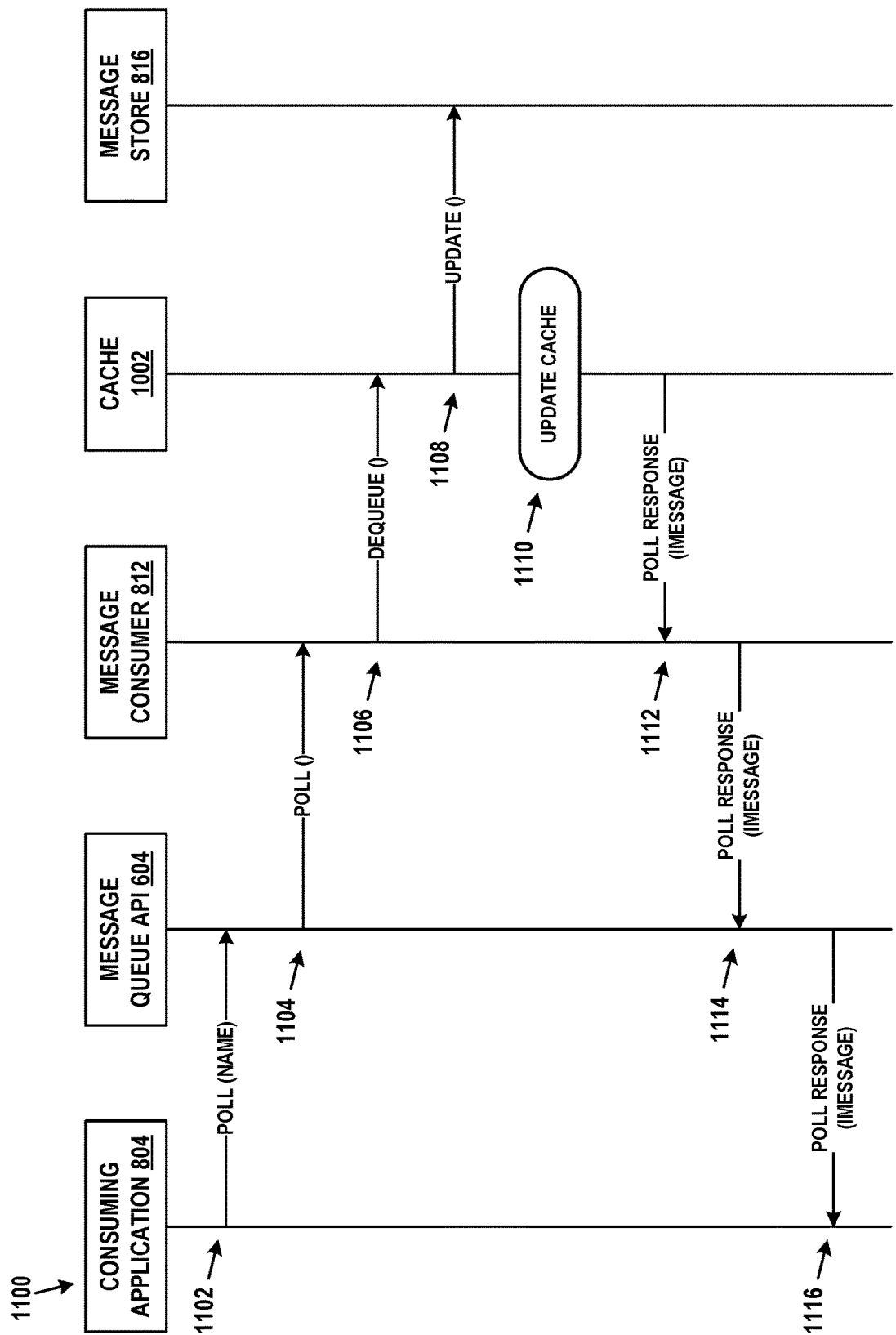
FIG. 11 is a flow diagram for reading a message from a message queue, in accordance with example embodiments.

FIGS. 10 and 11 depict flow diagrams that respectively illustrate how the messaging framework supports placing messages in a message queue and delivering messages from the message queue. In these figures, it is assumed that the message queue has been created and named and that the producing and consuming applications are aware of the name, and that persistent cached delivery mode has been selected for the message queue.

FIG. 10 depicts flow diagram 1000 for placing a message in a message queue. This transaction involves producing application 802, message queue API 604, message producer 810, cache 1002, and message store 816. Other components or modules not shown in FIG. 10 may be involved as well.

At step 1004, producing application 802 calls the send method (see FIG. 9 and the accompanying discussion) to provide a message body to the message queue. The message queue is identified by name in this method call.

At step 1006, message queue API 604 locates the pre-constructed context for the named queue. This context is then used to determine the associated message producer 810. These contexts may be constructed and loaded into memory upon initialization of the message queue framework.

At step 1008, message queue API 604 may forward the message body to message producer 810.

At step 1010 message producer 810 may construct an IMessage object from the message body and possibly any relevant information in context 808 that relates to the message queue.

At step 1012, message producer 810 may request enqueueing of the IMessage object in the message queue. Doing so may involve providing the IMessage object to cache 1002. The enqueueing request may be made on a specialized object of a persistent cached queue class. This object is then responsible for both persisting and caching of the IMessage object, or neither if one of the operations fails. The cache is owned and controlled by the persistent cached queue object and may or may not be considered as a separate entity. The cache itself may contain no logic other than for inserting, updating or removing an IMessage object from cache 1002. But for sake of simplicity, both these items will be referred to herein as "cache 1002".

At step 1014, cache 1002 may write the IMessage object to a structure in message store 816 (non-volatile memory) that represents the message queue. At step 1016, cache 1002 may cache (store in volatile memory) the IMessage object. Cache 1002 represents a copy of the message queue maintained in low-latency memory.

In various embodiments, certain steps may be performed in a different order. For example, the order of steps 1014 and 1016 may be reversed. Also not shown, an acknowledgement that the enqueue/send procedure was successful may be sent from cache 1002 to producing application 802 by way of message producer 810 and message queue API 604.

FIG. 11 depicts flow diagram 1100 for reading a message from a message queue. This transaction involves consuming application 804, message queue API 604, message consumer 812, cache 1002, and message store 816. Other components or modules not shown in FIG. 11 may be involved as well.

At step 1102, consuming application 804 calls the poll method (see FIG. 9 and the accompanying discussion) to request a message from the message queue. The message queue is identified by name in this method call.

At step 1104, message queue API 604 may request the message from message consumer 812. This may involve message queue API 604 determining the queue based on its name and/or relevant information in context 808, for example.

At step 1106, message consumer 812 may request dequeueing of the message from cache 1002.

At step 1108, cache 1002 may update message store 816 based on this dequeueing request. For example, if the message queueing is defined with the point-to-point messaging mode, this update may result in message store 816 deleting the message. Regardless, if the message is in cache 1002, it can be delivered from the cached copy. If the message is not currently in cache 1002, it can be delivered from the copy in message store 816 before the latter is deleted.

At step 1110, cache 1002 is updated to reflect that the message has been read. For example, if the message queue is defined with the point-to-point messaging mode, this update may result in cache 1002 deleting the message.

At step 1112, cache 1002 may provide a poll response containing the message in an IMessage object to message consumer 812. Likewise, at step 1114, message consumer 812 may provide a poll response containing the IMessage to message queue API 604. Similarly, at step 1116, message queue API 604 may provide a poll response containing the IMessage to consuming application 804.

In various embodiments, certain steps may be performed in a different order. For example, the order of steps 1108 and 1110 may be reversed.

F. Message Priority

As noted above, the ordering mode of a message queue may determine whether the messages therein are provided in chronological or priority order. But prioritized queueing can be implemented in a number of ways, each with various advantages and disadvantages. In the context of a multi-application platform, such as remote network management platform 320, it has been found that strict priority queueing can lead to starvation. Specifically, when a large number of higher-priority messages are in a message queue, these messages will "starve" lower-priority messages. In other words, the higher-priority messages will continuously be provided to consuming applications with few if any lower-priority messages being provided.

Figure 12A:
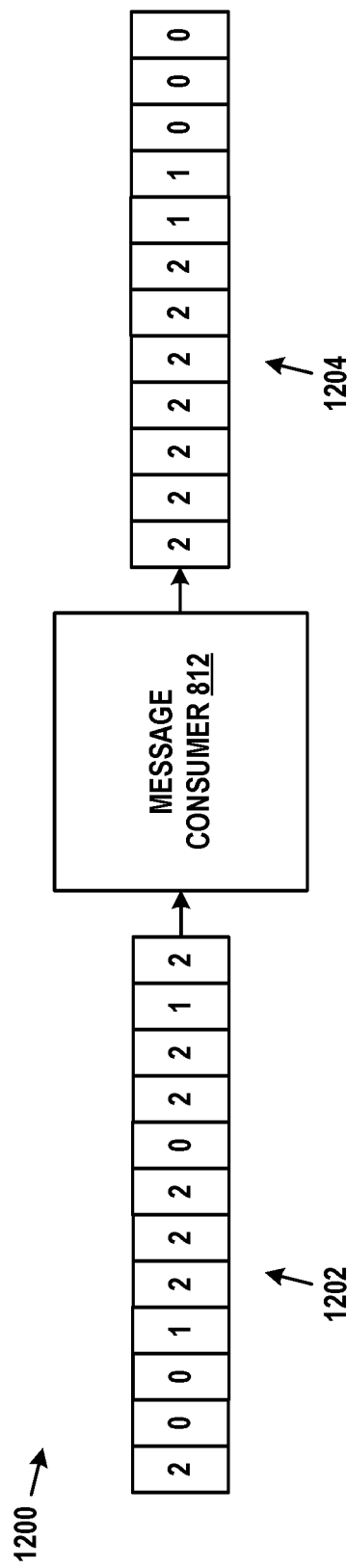
FIGS. 12A and 12B respectively depict priority and modified priority (by yield) delivery of messages from a message queue, in accordance with example embodiments.

An example of this phenomenon is shown in queue configuration 1200 of FIG. 12A. Incoming messages 1202 are marked with one of three priorities—0, 1, or 2. It is assumed that priority 0 is higher than priority 1 and that priority 1 is higher than priority 2. Consequently, message consumer 812 provides these messages in the order shown by outgoing messages 1204. Notably, all of the priority 0 messages are delivered first, then all of the priority 1 messages, then all of the priority 2 messages.

As can be seen from the depiction in FIG. 12A, when there is a large and continuous supply of incoming priority 0 messages, these messages will be served to the detriment of lower priority messages. In some cases, the lower priority messages may be starved to the point that applications relying on their delivery may experience error conditions or fail.

To overcome this problem, prioritized queueing with a configurable yield feature may be employed. The yield feature specifies that for every n higher-priority messages delivered, m lower-priority messages are delivered. Each level of message priority can have its own yield configuration. Thus, for example, the yield configuration for priority 0 messages may be n=2 and m=1 (for every two priority 0 messages delivered, deliver one lower-priority message if such a message is available). For the same message queue, the yield configuration for priority 1 messages may be n=3 and m=1 (for every three priority 1 messages delivered, deliver one lower-priority message if such a message is available). Other possibilities exist.

Figure 12B:
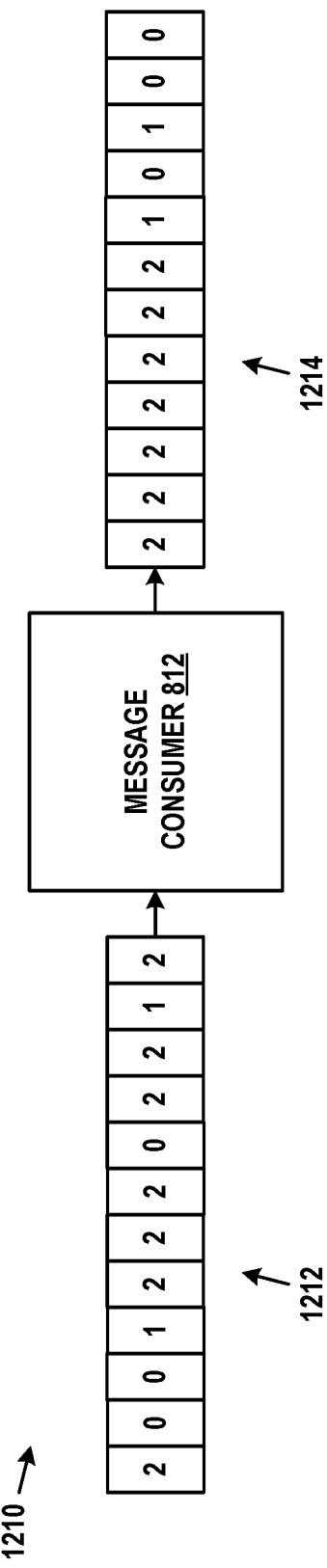

An example of this feature is shown in queue configuration 1210 of FIG. 12B. Incoming messages 1212 are ordered identically as those of incoming messages 1202. But message consumer 812 is configured to apply a yield configuration for priority 0 messages with n=2 and m=1. Thus, in outgoing messages 1214, message consumer 812 provides two priority 0 messages and then the yield configuration is applied. Therefore, message consumer 812 provides one priority 1 message before providing the next priority 0 message.

Such an arrangement mitigates the starvation that strict prioritized queueing may cause. Further, n and m can be set to any values such that n>m and both are greater than 0.

VI. Example Operations

Figure 13:
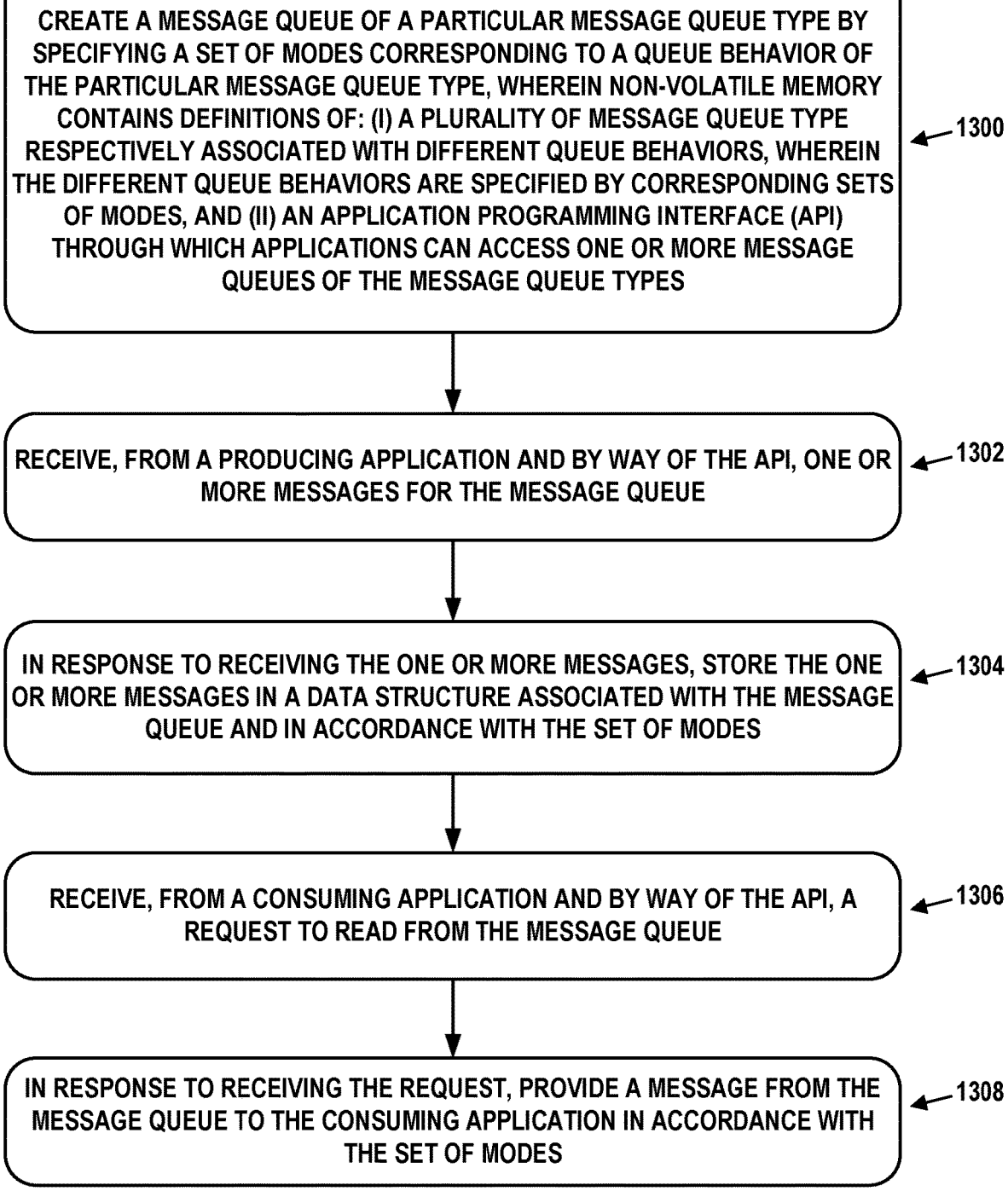
FIG. 13 is a flow chart, in accordance with example embodiments.

FIG. 13 is a flow chart illustrating an example embodiment. The process illustrated by FIG. 13 may be carried out by a computing device, such as computing device 100, and/or a cluster of computing devices, such as server cluster 200. However, the process can be carried out by other types of devices or device subsystems. For example, the process could be carried out by a computational instance of a remote network management platform or a portable computer, such as a laptop or a tablet device.

The embodiments of FIG. 13 may be simplified by the removal of any one or more of the features shown therein. Further, these embodiments may be combined with features, aspects, and/or implementations of any of the previous figures or otherwise described herein.

Block 1300 may involve creating a message queue of a particular message queue type by specifying a set of modes corresponding to a queue behavior of the particular message queue type, wherein non-volatile memory contains definitions of: (i) a plurality of message queue types respectively associated with different queue behaviors, wherein the different queue behaviors are specified by corresponding sets of modes, and (ii) an application programming interface (API) through which applications can access one or more message queues of the message queue types.

Block 1302 may involve receiving, from a producing application and by way of the API, one or more messages for the message queue.

Block 1304 may involve, possibly in response to receiving the one or more messages, storing the one or more messages in a data structure associated with the message queue and in accordance with the set of modes.

Block 1306 may involve receiving, from a consuming application and by way of the API, a request to read from the message queue.

Block 1308 may involve, possibly in response to receiving the request, providing a message from the message queue to the consuming application in accordance with the set of modes.

Some embodiments may further involve: creating a second message queue of a second particular message queue type by specifying a second set of modes corresponding to a second queue behavior of the second particular message queue type; receiving, from a second producing application and by way of the API, one or more further messages for the second message queue; possibly in response to receiving the one or more further messages, storing the one or more further messages in a second data structure associated with the second message queue and in accordance with the set of modes; receiving, from a second consuming application and by way of the API, a second request to read from the second message queue; and possibly in response to receiving the second request, providing a second message from the second message queue to the second consuming application in accordance with the set of modes.

In some embodiments, the message queue is created with a name, wherein the producing application provides the name with the one or more messages, wherein the consuming application provides the name with the request, and wherein the name is used to identify the message queue.

In some embodiments, a messaging framework includes: (i) a producer module configured to receive the one or more messages from the API and place the one or more messages in the message queue, and (ii) a consumer module configured to receive the request from the API, identify the message, and provide the message to the API.

In some embodiments, the message contains a body, a client header, and a service header, wherein the body contains content from the producing application that the producer module and the consumer module transparently provide to the consuming application, wherein the client header contains metadata from the producing application that the producer module and the consumer module transparently provide to the consuming application, and wherein the service header contains metadata that is not provided to the consuming application, and is used by the producer module or the consumer module.

In some embodiments, the messaging framework also includes a context or context factory configured to store mappings between the different queue behaviors and their associated message queue implementations, wherein the producer module and the consumer module use the context to identify the message queue.

In some embodiments, the set of modes includes a messaging mode that is either point-to-point or publish/subscribe, wherein the messaging mode being point-to-point results in the message being removed from the message queue when provided to the consuming application, and wherein the messaging mode being publish/subscribe results in the message persisting in the message queue when provided to the consuming application.

In some embodiments, the set of modes includes an ordering mode that is either chronological or priority, wherein the ordering mode being chronological results in the message queue having first-in-first-out (FIFO) operation, and wherein the ordering mode being priority results in the message queue having non-FIFO operation.

In some embodiments, the non-FIFO operation involves all messages in the message queue being assigned one of a plurality of priorities, wherein a first priority of the plurality of priorities has a higher precedence than a second priority of the plurality of priorities, wherein the message queue delivers m messages of the second priority for every n messages delivered of the first priority, and wherein n>m.

In some embodiments, the set of modes includes a delivery mode that is either in-memory, persistent, or persistent cached, wherein the delivery mode being in-memory results in messages in the message queue being stored only in volatile memory, wherein the delivery mode being persistent results in the messages in the message queue being stored only in the non-volatile memory, and wherein the delivery mode being persistent cached results in the messages in the message queue being stored in the volatile memory and at least some of the messages being cached in the non-volatile memory.

In some embodiments, the set of modes includes a connection mode that is either unidirectional or bidirectional, wherein the connection mode being unidirectional results in messages in the message queue only flowing from the producing application to the consuming application, and wherein the connection mode being bidirectional results in some of the messages in the message queue flowing from the producing application to the consuming application and other messages in the message queue flowing from the consuming application to the producing application.

VII. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, or compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

The invention claimed is:

1. A system comprising:
non-volatile memory containing definitions of: (i) a plurality of message queue implementations respectively associated with different queue behaviors, wherein the different queue behaviors are specified by corresponding sets of modes, and (ii) an application programming interface (API) through which applications executing on the system can access one or more message queues of the message queue implementations, wherein the sets of modes includes an ordering mode that is either chronological or priority, wherein the ordering mode being chronological results in the message queue having first-in-first-out (FIFO) operation, wherein the ordering mode being priority results in the message queue having non-FIFO operation, wherein the non-FIFO operation involves all messages in the message queue being assigned one of a plurality of priorities, wherein a first priority of the plurality of priorities has a higher precedence than a second priority of the plurality of priorities, wherein the system is configured to cause the message queue to deliver m messages of the second priority for every n messages delivered of the first priority, and wherein n>m; and
one or more processors configured to:
create a message queue of a particular message queue type, supported by a corresponding message queue implementation, by specifying a set of modes corresponding to a queue behavior of the particular message queue type;
receive, from a producing application executing on the system and by way of the API, one or more messages for the message queue;
in response to receiving the one or more messages, store the one or more messages in a data structure associated with the message queue and in accordance with the set of modes;
receive, from a consuming application executing on the system and by way of the API, a request to read from the message queue; and
in response to receiving the request, provide a message from the message queue to the consuming application in accordance with the set of modes.

2. The system of claim 1, wherein the one or more processors are further configured to:
create a second message queue of a second particular message queue type, supported by a corresponding message queue implementation, by specifying a second set of modes corresponding to a second queue behavior of the second particular message queue type;
receive, from a second producing application executing on the system and by way of the API, one or more further messages for the second message queue;
in response to receiving the one or more further messages, store the one or more further messages in a second data structure associated with the second message queue and in accordance with the set of modes;
receive, from a second consuming application executing on the system and by way of the API, a second request to read from the second message queue; and
in response to receiving the second request, provide a second message from the second message queue to the second consuming application in accordance with the set of modes.

3. The system of claim 1, wherein the message queue is created with a name, wherein the producing application provides the name with the one or more messages, wherein the consuming application provides the name with the request, and wherein the system uses the name to identify the message queue.

4. The system of claim 1, wherein a messaging framework within the system includes: (i) a producer module configured to receive the one or more messages from the API and place the one or more messages in the message queue, and (ii) a consumer module configured to receive the request from the API, identify the message, and provide the message to the API.

5. The system of claim 4, wherein the message contains a body, a client header, and a service header, wherein the body contains content from the producing application that the producer module and the consumer module transparently provide to the consuming application, wherein the client header contains metadata from the producing application that the producer module and the consumer module transparently provide to the consuming application, and wherein the service header contains metadata that is not provided to the consuming application, and is used by the producer module or the consumer module.

6. The system of claim 4, wherein the messaging framework also includes a context configured to store mappings between the different queue behaviors and their associated message queue implementations, and wherein the producer module and the consumer module use the context to identify the message queue.

7. The system of claim 1, wherein the set of modes includes a messaging mode that is either point-to-point or publish/subscribe, wherein the messaging mode being point-to-point results in the message being removed from the message queue when provided to the consuming application, and wherein the messaging mode being publish/subscribe results in the message persisting in the message queue when provided to the consuming application.

8. The system of claim 1, wherein the set of modes includes a delivery mode that is either in-memory, persistent, or persistent cached, wherein the delivery mode being in-memory results in messages in the message queue being stored only in volatile memory, wherein the delivery mode being persistent results in the messages in the message queue being stored only in the non-volatile memory, and wherein the delivery mode being persistent cached results in the messages in the message queue being stored in the volatile memory and at least some of the messages being cached in the non-volatile memory.

9. The system of claim 1, wherein the set of modes includes a connection mode that is either unidirectional or bidirectional, wherein the connection mode being unidirectional results in messages in the message queue only flowing from the producing application to the consuming application, and wherein the connection mode being bidirectional results in some of the messages in the message queue flowing from the producing application to the consuming application and other messages in the message queue flowing from the consuming application to the producing application.

10. A computer-implemented method comprising:
creating a message queue of a particular message queue type by specifying a set of modes corresponding to a queue behavior of the particular message queue type, wherein non-volatile memory contains definitions of: (i) a plurality of message queue type respectively associated with different queue behaviors, wherein the different queue behaviors are specified by corresponding sets of modes, and (ii) an application programming interface (API) through which applications can access one or more message queues of the message queue types, wherein the sets of modes includes an ordering mode that is either chronological or priority, wherein the ordering mode being chronological results in the message queue having first-in-first-out (FIFO) operation, wherein the ordering mode being priority results in the message queue having non-FIFO operation, wherein the non-FIFO operation involves all messages in the message queue being assigned one of a plurality of priorities, wherein a first priority of the plurality of priorities has a higher precedence than a second priority of the plurality of priorities, wherein the message queue delivers m messages of the second priority for every n messages delivered of the first priority, and wherein n>m;
receiving, from a producing application and by way of the API, one or more messages for the message queue;
in response to receiving the one or more messages, storing the one or more messages in a data structure associated with the message queue and in accordance with the set of modes;
receiving, from a consuming application and by way of the API, a request to read from the message queue; and
in response to receiving the request, providing a message from the message queue to the consuming application in accordance with the set of modes.

11. The computer-implemented method of claim 10, wherein a messaging framework includes: (i) a producer module configured to receive the one or more messages from the API and place the one or more messages in the message queue, and (ii) a consumer module configured to receive the request from the API, identify the message, and provide the message to the API.

12. The computer-implemented method of claim 11, wherein the message contains a body, a client header, and a service header, wherein the body contains content from the producing application that the producer module and the consumer module transparently provide to the consuming application, wherein the client header contains metadata from the producing application that the producer module and the consumer module transparently provide to the consuming application, and wherein the service header contains metadata that is not provided to the consuming application, and is used by the producer module or the consumer module.

13. The computer-implemented method of claim 10, wherein the set of modes includes a messaging mode that is either point-to-point or publish/subscribe, wherein the messaging mode being point-to-point results in the message being removed from the message queue when provided to the consuming application, and wherein the messaging mode being publish/subscribe results in the message persisting in the message queue when provided to the consuming application.

14. The computer-implemented method of claim 10, wherein the set of modes includes a delivery mode that is either in-memory, persistent, or persistent cached, wherein the delivery mode being in-memory results in messages in the message queue being stored only in volatile memory, wherein the delivery mode being persistent results in the messages in the message queue being stored only in the non-volatile memory, and wherein the delivery mode being persistent cached results in the messages in the message queue being stored in the volatile memory and at least some of the messages being cached in the non-volatile memory.

15. The computer-implemented method of claim 10, wherein the set of modes includes a connection mode that is either unidirectional or bidirectional, wherein the connection mode being unidirectional results in messages in the message queue only flowing from the producing application to the consuming application, and wherein the connection mode being bidirectional results in some of the messages in the message queue flowing from the producing application to the consuming application and other messages in the message queue flowing from the consuming application to the producing application.

16. An article of manufacture including a non-transitory computer-readable medium, having stored thereon program instructions that, upon execution by a computing system, cause the computing system to perform operations comprising:
    creating a message queue of a particular message queue type by specifying a set of modes corresponding to a queue behavior of the particular message queue type, wherein non-volatile memory contains definitions of: (i) a plurality of message queue types respectively associated with different queue behaviors, wherein the different queue behaviors are specified by corresponding sets of modes, and (ii) an application programming interface (API) through which applications executing on the computing system can access one or more message queues of the message queue types, wherein the sets of modes includes an ordering mode that is either chronological or priority, wherein the ordering mode being chronological results in the message queue having first-in-first-out (FIFO) operation, wherein the ordering mode being priority results in the message queue having non-FIFO operation, wherein the non-FIFO operation involves all messages in the message queue being assigned one of a plurality of priorities, wherein a first priority of the plurality of priorities has a higher precedence than a second priority of the plurality of priorities, wherein the message queue delivers m messages of the second priority for every n messages delivered of the first priority, and wherein n>m;
    receiving, from a producing application executing on the computing system and by way of the API, one or more messages for the message queue;
    in response to receiving the one or more messages, storing the one or more messages in a data structure associated with the message queue and in accordance with the set of modes;
    receiving, from a consuming application executing on the computing system and by way of the API, a request to read from the message queue; and
    in response to receiving the request, providing a message from the message queue to the consuming application in accordance with the set of modes.

17. The article of manufacture of claim 16, wherein a messaging framework includes: (i) a producer module configured to receive the one or more messages from the API and place the one or more messages in the message queue, and (ii) a consumer module configured to receive the request from the API, identify the message, and provide the message to the API.

18. The article of manufacture of claim 17, wherein the message contains a body, a client header, and a service header, wherein the body contains content from the producing application that the producer module and the consumer module transparently provide to the consuming application, wherein the client header contains metadata from the producing application that the producer module and the consumer module transparently provide to the consuming application, and wherein the service header contains metadata that is not provided to the consuming application, and is used by the producer module or the consumer module.

19. The article of manufacture of claim 16, wherein the set of modes includes a messaging mode that is either point-to-point or publish/subscribe, wherein the messaging mode being point-to-point results in the message being removed from the message queue when provided to the consuming application, and wherein the messaging mode being publish/subscribe results in the message persisting in the message queue when provided to the consuming application.

20. The article of manufacture of claim 16, wherein the set of modes includes a delivery mode that is either in-memory, persistent, or persistent cached, wherein the delivery mode being in-memory results in messages in the message queue being stored only in volatile memory, wherein the delivery mode being persistent results in the messages in the message queue being stored only in the non-volatile memory, and wherein the delivery mode being persistent cached results in the messages in the message queue being stored in the volatile memory and at least some of the messages being cached in the non-volatile memory.

* * * * *